May 26, 1942.    C. M. BAKER    2,283,899
PIPE CLAMP
Filed May 24, 1940    2 Sheets-Sheet 1
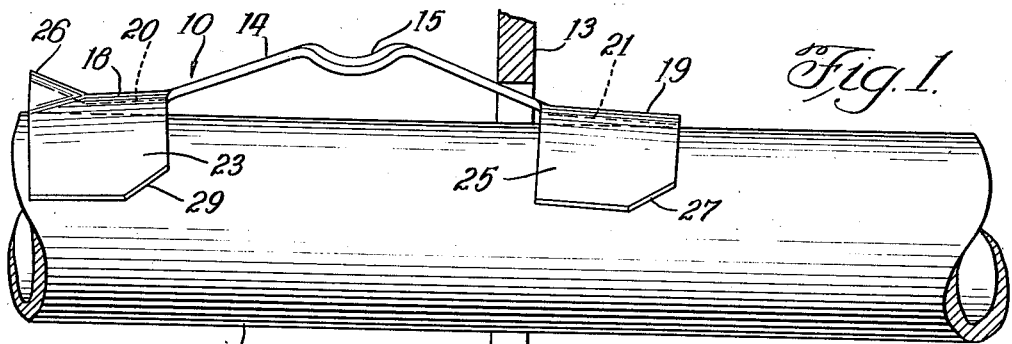
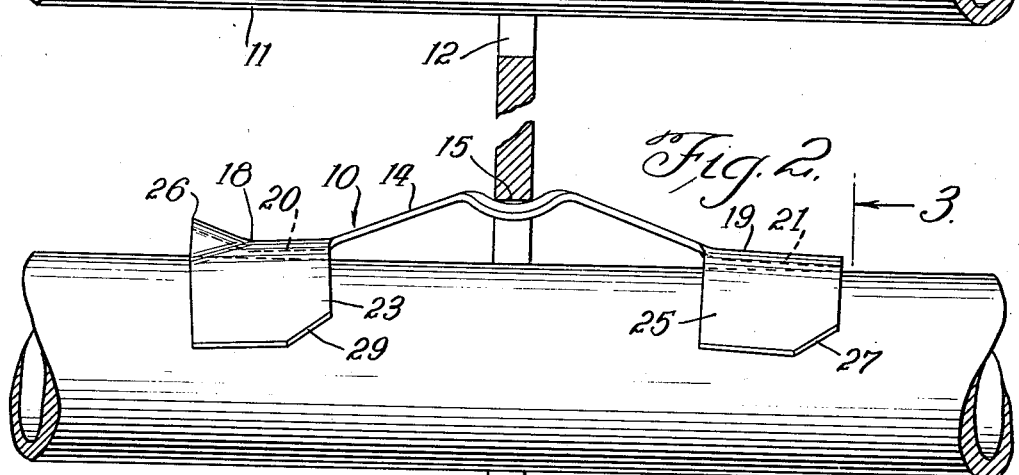
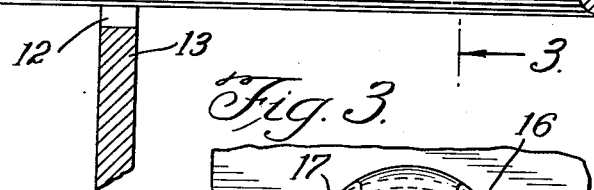
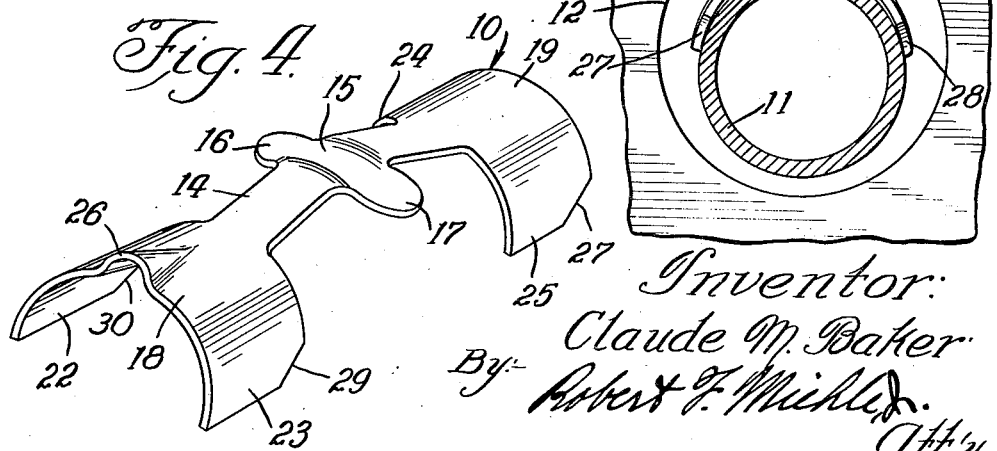
Inventor:
Claude M. Baker May 26, 1942.  C. M. BAKER  2,283,899
PIPE CLAMP
Filed May 24, 1940  2 Sheets-Sheet 2
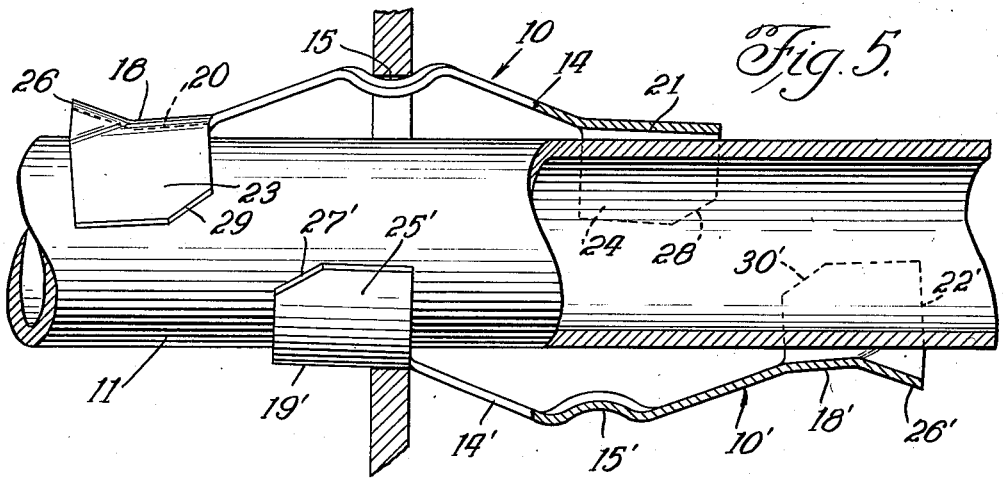
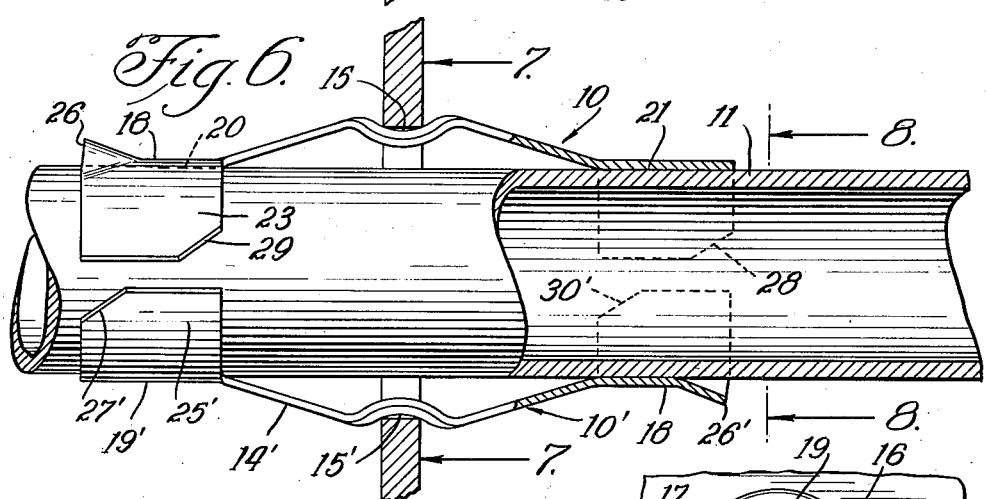
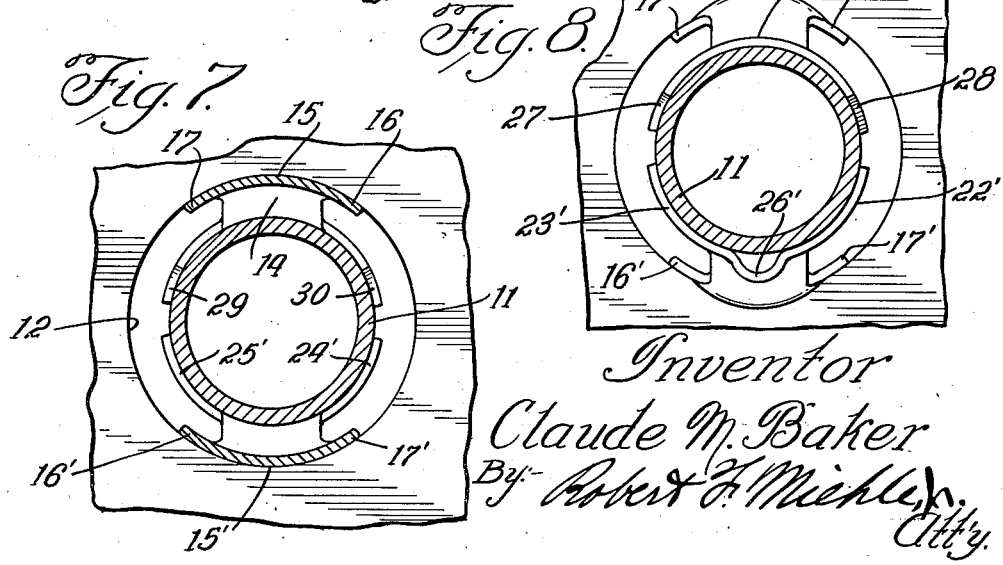
Inventor
Claude M. Baker
By Robert F. Miehle
Atty.

Patented May 26, 1942

2,283,899

UNITED STATES PATENT OFFICE 2,283,899

PIPE CLAMP

Claude M. Baker, Winnetka, Ill., assignor of one-half to Jay V. Wescott and one-half to Florence W. Wescott, both of Chicago, Ill.

Application May 24, 1940, Serial No. 337,024

6 Claims. (Cl. 248—56)

My invention relates particularly to a clamp for holding a pipe, conduit, rod or the like, selectively disposed within an opening through a supporting means therefor.

The primary object of the present invention is the provision of an improved resilient pipe holding clamp which may be flexed for placement in supporting relationship between a pipe and the side wall of an opening through which the pipe passes, and which is operable to remain thus assembled because of reactive forces thereof against said pipe and side wall, without the aid of bolts, rivets, pins or other auxiliary fastening means.

A further object of the present invention is the provision of a novel unitary strap-like clamp device of the above character which has a resiliently flexible bow member insertable between a pipe and the side wall of an opening in which the pipe is disposed and seats means upon the ends of said bow member for engaging and imparting reactive holding force against the pipe.

A still further object of this invention is the provision of a novel shock-absorbing clamping and supporting structure for a pipe and comprising a plurality of clamp members which are economically produced and easily installed without the use of special tools.

With these objects in view my invention consists in certain features of novelty in the construction, combination and arrangement of parts by which the said objects and certain other objects, hereinafter appearing, are effected, all as fully described with reference to the accompanying drawings and more particularly pointed out in the appended claims.

In the drawings—

Fig. 1 is a side elevational view of a resilient flexible clamp constructed according to the invention, the clamp being shown in its relaxed condition upon a pipe where it is poised preparatory to being slid endwise for disposal in a locking position between the pipe and the side wall of an opening within a pipe supporting member;

Fig. 2 is a view similar to Fig. 1 but illustrating the clamp, partially flexed, in the aforesaid locking position;

Fig. 3 is a transverse sectional view taken on the line 3—3 of Fig. 2;

Fig. 4 is a perspective view of the clamp shown in the lower numbered figures;

Fig. 5 is a side elevational view, partly in section, illustrating one clamp in seated relation between a pipe and the side wall of an opening in a supporting means for the pipe, and a second clamp poised for insertion in seated relation between the pipe and a diametrically opposite section of said side wall;

Fig. 6 is a view similar to Fig. 5 showing both clamps assembled in the clamping seated relation between the pipe and supporting member opening;

Fig. 7 is a transverse sectional view taken on the line 7—7 of Fig. 6; and

Fig. 8 is a transverse sectional view taken on the line 8—8 of Fig. 6.

My invention has particular utility as an expediently applied clamping device for resiliently yet firmly holding pipes in place upon the undercarriage of railway cars. Prior clamping devices for securing such pipes to their undercarriage holding means, such as apertured webs have consisted of a plurality of parts drawn into clamping relation with the pipes by bolt and nut means, and attached to said holding means by additional bolt and nut means, rivets, or the like. While the present invention is admirably applicable to the environment of the aforesaid clamps which it is adapted to supplant, it will be understood that the invention is equally applicable to clamping means for any conduit, rod, or elongated member passing through an opening within a supporting means therefor, wherefore it is intended that the term "pipe" shall have this generic connotation where used throughout this specification and in the appended claims.

Referring now to the drawings, and particularly to Figs. 1, 2, 3 and 4, one of my improved clamps is there generally indicated by the reference character 10. Said clamp 10 is shown in association with a pipe 11 which extends through an opening 12 in a web, flange, or the like 13 of a supporting means for the pipe. Clamps as 10, in the present embodiment of the invention, are adapted to be used in pairs as illustrated in Figs. 6, 7 and 8 where the clamp 10 and a similar clamp 10' are shown in assembled cooperative clamping relation with the pipe 11. Since, however, both of the clamps 10 and 10' are identical, a detailed description is herein given of only the clamp 10 and the corresponding parts of the clamp 10' are indicated by the same respective reference characters with a prime added.

The clamp 10 may be pressed into shape from a sheet metal stamping of suitable thickness. Thus said clamp consists of a generally strap-like body comprising as its center portion a bow member 14 which is bent inwardly between its ends for effecting a saddle or support engaging section 15. The saddle 15 includes a pair of wings 16 and 17 extending oppositely from and transversely of the member 14, said wings 16 and 17 being curved inwardly in an amount to cause their outer periphery to correspond substantially to a peripheral arc upon the side wall of an opening as 12 into which the saddle 15 is to be inserted.

Seating means for the pipe 11 are provided at opposite ends of the bow member 14, such seating means respectively comprising concavo-convex pipe seat sections 18 and 19. The concave faces of the seat sections 18 and 19 describe a simple curve corresponding substantially to the curvature of the pipe as 11 upon which they are to be seated when a pair of the devices is installed. Hence the axial elements upon the inner periphery of the seat section 18 are substantially parallel as are the axial elements upon the inner periphery of the seat section 19. The bow member 14 is both flexible and resilient and is shown in Fig. 1 in its relaxed condition where it will be seen that said axial elements as 20 and 21 upon the seat sections 18 and 19 converge outwardly of the device and generally toward the center of said bow member 14. But when the saddle of the bow member is pressed inwardly, said member will be distorted for causing the axial elements as 20 and 21 to assume mutually aligned positions to enable them to lie flatly along the pipe 11 as shown in Fig. 6.

A pair of pipe gripping fingers 22 and 23 project oppositely from the seat section 18 and transversely with respect to the bow member 14. These fingers 22 and 23, as well as corresponding fingers 24 and 25 which project oppositely from the seat section 19, are curved to effect with their respective seat sections a configuration simulating that at the shorter radius end of an ellipse as is clearly illustrated in Fig. 3 where the configuration of the seat section 19 and a circular section of the pipe 11 are visible for comparison. These pipe gripping fingers as 24 and 25 as well as the seat sections as 19 are resiliently flexible so that when said seat sections are pressed radially inwardly of the pipe, the ends of their associated fingers as 24 and 25 will be forced apart. When the seating sections are pressed into engagement with the pipe, they, together with their associated fingers as 24 and 25, will flatly engage the pipe while the resiliency of the fingers will cause them to grippingly engage the pipe.

One end of the clamps as 10 constitutes the leading end thereof since it is the end which is normally advanced foremost along the pipe and through the opening as 12. The opposite end of the clamp is the trailing end and may have therein an upwardly deflected driving lip 26 which may be struck by a suitable driving implement for forcing the clamp into the opening. The leading edges of the fingers as 24 and 25 near their ends have backwardly directed deflecting edge sections 27 and 28, whereas the leading edges of the fingers 22 and 23 have similar deflecting edge sections 29 and 30. It is the function of these deflecting sections to prevent the second inserted of the clamps from lodging against the first inserted clamp in the event of said clamps becoming misaligned circumferentially of the pipe. This will be explained more fully presently.

The first step in the assembly of a pair of my improved clamps with a pipe as 11 and a supporting means as 13 therefor is to insert the leading end of one of the clamps through the oversize opening or hole 12 as illustrated in Fig. 1. Thereafter the clamp is forced home by pressing or driving it to the right into the position shown in Fig. 2 incident to flexing the resilient bow member 14 inwardly. In the present installation where a pair of clamps 10 are to be employed the opening as 12 will be sufficiently large in diameter that the bow member 14 first inserted does not flex sufficiently far to cause placement of the axial elements as 20 and 21 in the seat sections 18 and 19 flatly upon the pipe 11. Neither will the resilient fingers as 24 and 25 upon these seat sections be forced completely downwardly over the pipe 11 wherefore crescent spaces as that indicated at S in Fig. 3 will exist between said seat sections and the pipe. It will be understood, however, that more than two clamps may be placed about the pipe in an installation or that but a single clamp may be used and in the latter instance the angularity of the seat sections with the bow member, longitudinally thereof, will be so chosen that the axial elements as 20 and 21 will lie flatly along the pipe surface when the bow saddle registers with the side wall of the opening 12.

Following insertion of the first clamp 10 in the manner described, the second clamp 10' will have the seat section 19' at its leading end inserted between the pipe 11 and the opening 12 at the diametrically opposite side of such opening with respect to that at which the saddle 15 of the clamp 10 is disposed; see Fig. 5. Thereupon the clamp 10' will be forced home by shifting it to the left along the pipe 11 until the saddle 15' registers with and receives the wall section of the opening 12 at said diametrically opposite side. Normally, the second of the clamps, 10', will be inserted through the opening 12 from the side opposite to that at which the trailing end of the first inserted clamp is positioned so that should any misalignment develop between the clamps 10 and 10' while the second clamp is being axially moved to the assembled position, the deflecting sections as 27' or 30' will simply slide along the deflecting sections as 29 and 28 of the clamp 10 without blocking advancement of said member 10'. Ordinarily driving impacts will be applied to the drive lip 26' for forcing said clamp to the left into the position shown in Fig. 6 with the bow member 14' thereof flexed. Incident to such flexing of the bow member 14', the force imparted thereby through the seat sections 18' and 19' upon the pipe 11 will slightly deflect such pipe toward the seat sections 18 and 19 upon the opposed clamp 10 so that when the clamps 10 and 10' are both in their home positions, the bow members 14 and 14' will both be flexed inwardly sufficiently far to cause the axial elements as 20 and 21 upon the seat sections as 18 and 19 to lie flatly upon the pipe. Furthermore, the seat sections while in this seated relation will have advanced the pipe gripping fingers as 24 and 25 sufficiently onto the pipe while expanding them to cause them to flatly or uniformly engage the pipe as illustrated in Figs. 7 and 8.

It will be seen, therefore, that when the clamps are fully installed, the seat sections, including their pipe gripping fingers as 24 and 25, will engage the pipe over a substantial area to stabilize the bow members as 14 against lateral deflection circumferentially of the opening 12 and to augment the frictional resistance to relative movement between these seat sections and the pipe. Moreover, the curved wing extensions 16 and 17 of the saddles 15 and 15' conform to the circular side wall of the opening 12 to increase the bearing area between such saddles and the supporting means 13, thus reducing the pressure per unit of area within the saddles and the rapidity with which wear would occur between these surfaces should relative vibratory movement be incurred between such saddles and the supporting means 13 during service of the assembly.

My improved clamping means, since it is made from a sheet metal stamping capable of being pressed into the desired shape by conventional die means, has a great advantage from the standpoint of economical production. The device is also more easily installed than the prior devices which have required the placement and manipulation of threaded members as nuts and bolts and/or rivets. The assembled installation is self-locking to prevent it from becoming loosened while in use. It also incurs the further advantage of providing a noiseless yieldable cushion support for holding the pipe in the desired position.

It will be obvious to those skilled in the art that many changes may be made in the single embodiment herein disclosed without departing from the spirit of the invention, wherefor I claim as new and desire to secure by Letters Patent, the following:

1. In a clamp of the class described, a generally strap-like body comprising a resiliently flexible bow member, plate-like concavo-convex pipe seat sections respectively at the ends of said bow member, the concave sides of said bow member and of said seat sections being upon the inner side of said clamp, an out-turned driving lip upon the end of one of said seat sections, and inwardly curved pipe engaging fingers extending oppositely from each of said seating sections and laterally with respect to said bow member.

2. A clamp of the class described consisting of a strap-like body comprising a resiliently flexible bow member having leading and trailing ends, plate-like concavo-convex pipe seat sections respectively at the ends of said bow member, the concave sides of said bow member and of said seat sections being upon the inner side of said clamp, pipe engaging fingers extending oppositely from each of said seating sections and laterally with respect to said bow member, and backwardly inclined deflecting edge sections upon and adjacently to the extending ends of at least part of said fingers.

3. A clamp of the class described comprising a resiliently flexible bow member, pipe seating means at the ends of said bow member and facing inwardly thereof, and a support engaging portion on said bow member intermediate said seating means and facing outwardly of said bow member.

4. A clamp of the class described comprising a resiliently flexible bow member, concave pipe seating means at the ends of said bow member and facing inwardly and extending laterally thereof, and a concave support engaging portion on and laterally traversing said bow member intermediate said seating means, and the concavity of said support engaging portion facing outwardly of the bow member.

5. A clamp of the class described comprising a resiliently flexible bow member, concave pipe seating means at the ends of said bow member and facing inwardly and extending laterally thereof, a concave support engaging portion on and laterally traversing said bow member intermediate said seating means, the concavity of said support engaging portion facing outwardly of the bow member, and pipe engaging fingers extending oppositely from each of said seating means and laterally with respect to said bow member.

6. A clamp for securing a pipe or the like extending through a relatively large opening through a support comprising a plurality of resiliently flexible bow members having their concave sides facing the pipe and arranged axially thereof and spaced angularly thereabout and extending through said opening in tensioned engagement with the pipe and opening, each of said bow members being provided with pipe seating means at the ends and facing inwardly thereof and with a support engaging portion intermediate said seating means and facing outwardly of the bow member.

CLAUDE M. BAKER.